(12) United States Patent
Ohta et al.

(10) Patent No.: US 8,106,374 B2
(45) Date of Patent: Jan. 31, 2012

(54) RADIATION IMAGE CAPTURING SYSTEM, RADIATION IMAGE CAPTURING METHOD, AND PROGRAM

(75) Inventors: Yasunori Ohta, Yokohama (JP); Naoki Mochizuki, Minami-ashigara (JP); Daiki Harada, Minami-ashigara (JP); Hiroshi Fukuda, Minato-ku (JP); Eiichi Kito, Minami-ashigara (JP); Naoyuki Nishino, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 384 days.

(21) Appl. No.: 12/391,875

(22) Filed: Feb. 24, 2009

(65) Prior Publication Data

US 2009/0218529 A1    Sep. 3, 2009

(30) Foreign Application Priority Data

Feb. 28, 2008  (JP) ................................. 2008-047605
Feb. 16, 2009  (JP) ................................. 2009-033213

(51) Int. Cl.
    *G01N 23/04* (2006.01)
(52) U.S. Cl. ...................................................... 250/582
(58) Field of Classification Search .................... 250/582
    See application file for complete search history.

(56) References Cited

U.S. PATENT DOCUMENTS

| 7,324,843 | B2 | 1/2008 | Pronk |
| 2002/0080918 | A1* | 6/2002 | Sako .............................. 378/115 |
| 2008/0154744 | A1* | 6/2008 | Amitani et al. .................. 705/26 |

FOREIGN PATENT DOCUMENTS

| JP | 2002-165782 A | 6/2002 |
| JP | 3494683 B2 | 11/2003 |
| JP | 2004-527303 A | 9/2004 |
| JP | 2006-247137 A | 9/2006 |

* cited by examiner

*Primary Examiner* — David Porta
*Assistant Examiner* — Shun Lee
(74) *Attorney, Agent, or Firm* — Sughrue Mion, PLLC

(57) ABSTRACT

A radiation image capturing system includes a first image capturing apparatus incorporating a radiation detector for detecting a radiation which has passed through a subject and converting the radiation into radiation image information, a second image capturing apparatus incorporating a stimulable phosphor panel for detecting a radiation which has passed through a subject, converting the radiation into radiation image information, and holding the radiation image information, and a processor for controlling the first image capturing apparatus and the second image capturing apparatus according to image capturing instruction information. The processor includes a priority activator for activating the second image capturing apparatus in preference to the first image capturing apparatus when the processor is activated.

8 Claims, 11 Drawing Sheets

RADIATION IMAGE CAPTURING SYSTEM, RADIATION IMAGE CAPTURING METHOD, AND PROGRAM

BACKGROUND OF THE INVENTION

1. Field of the Invention

The present invention relates to a radiation image capturing system, a radiation image capturing method, and a program for controlling a plurality of image capturing apparatus of different specifications with a processor according to image capturing instruction information to capture radiation images.

2. Description of the Related Art

In the medical field, there have widely been used radiation image capturing apparatus which apply a radiation to a subject and guide the radiation that has passed through the subject to a radiation detector, which captures a radiation image from the radiation.

One known radiation detector is a stimulable phosphor panel which stores a radiation energy representative of a radiation image in a phosphor. When the stimulable phosphor panel is irradiated with stimulating light, the phosphor emits stimulated light representative of the stored radiation image. The stimulable phosphor panel with the radiation image recorded therein is supplied to a reading apparatus which reads the stored radiation image as a visible radiation image.

There has also been developed a radiation detector having a solid-state detector for converting a radiation directly into an electric signal or converting a radiation into visible light with a scintillator and then converting the visible light into an electric signal to read a detected radiation image.

There are available in the art various image capturing apparatus of different specifications for capturing radiation images using radiation detectors depending on the conditions of patients as subjects to be imaged and image capturing conditions including body regions to be imaged. Those different image capturing apparatus are controlled by respective processors of specifications corresponding to the specifications of the image capturing apparatus. According to a known radiographic system, various image capturing apparatus and processors are connected to a radiology information system (RIS) by an in-house network, and patient information and image capturing instruction information representative of image capturing conditions set by the RIS which include image capturing methods, body regions to be imaged, radiation dose, etc. are supplied to the processors, which then control the corresponding image capturing apparatus to capture radiation images (see Japanese Laid-Open Patent Publication No. 2006-247137).

In sites of medical practice such as operating rooms or the like, it is often necessary to capture radiation images of urgent patients quickly in order to treat them quickly and correctly. Systems for capturing radiation images in such emergency cases are disclosed in Japanese Laid-Open Patent Publication No. 2002-165782 and Japanese Laid-Open Patent Publication No. 2004-527303 (PCT).

The system disclosed in Japanese Laid-Open Patent Publication No. 2002-165782 operates as follows: When an emergency image capturing mode is selected on a medical diagnostic apparatus, the medical diagnostic apparatus selects and displays emergency preset conditions on a display monitor, and the operator selects image capturing conditions according to the displayed emergency preset conditions.

The system disclosed in Japanese Laid-Open Patent Publication No. 2004-527303 (PCT) includes an emergency control unit having an emergency control means independently of a central control unit. In the event of a failure of the central control unit, the emergency control unit takes over and shoulders part of the processing sequence of the central control unit.

The emergency systems disclosed in Japanese Laid-Open Patent Publication No. 2002-165782 and Japanese Laid-Open Patent Publication No. 2004-527303 (PCT) are based on the assumption that they are being energized by a power supply. If the disclosed emergency systems are not being powered, then they are unable to immediately comply with a request to capture radiation images of urgent patients.

SUMMARY OF THE INVENTION

It is an object of the present invention to provide a radiation image capturing system, a radiation image capturing method, and a program which are capable of quickly activating image capturing apparatus when their power supplies are turned on after they have been de-energized, for thereby immediately handling interrupts for emergency image capturing requests.

According to an aspect of the present invention, a radiation image capturing system comprises a first image capturing apparatus incorporating a radiation detector for detecting a radiation which has passed through a subject and converting the radiation into radiation image information, a second image capturing apparatus incorporating a stimulable phosphor panel for detecting a radiation which has passed through a subject, converting the radiation into radiation image information, and holding the radiation image information, and a processor for controlling the first image capturing apparatus and the second image capturing apparatus according to image capturing instruction information, wherein the processor includes a priority activator for activating the second image capturing apparatus in preference to the first image capturing apparatus when the processor is activated.

According to another aspect of the present invention, there is also provided a method of capturing radiation image with a radiation image capturing system having a first image capturing apparatus incorporating a radiation detector for detecting a radiation which has passed through a subject and converting the radiation into radiation image information, a second image capturing apparatus incorporating a stimulable phosphor panel for detecting a radiation which has passed through a subject, converting the radiation into radiation image information, and holding the radiation image information, and a processor for controlling the first image capturing apparatus and the second image capturing apparatus according to image capturing instruction information, the method comprising the steps of activating the processor and activating the second image capturing apparatus in preference to the first image capturing apparatus when the processor is activated.

According to still another aspect of the present invention, there is further provided a program for controlling a radiation image capturing system having a first image capturing apparatus incorporating a radiation detector for detecting a radiation which has passed through a subject and converting the radiation into radiation image information, a second image capturing apparatus incorporating a stimulable phosphor panel for detecting a radiation which has passed through a subject, converting the radiation into radiation image information, and holding the radiation image information, and a processor for controlling the first image capturing apparatus and the second image capturing apparatus according to image capturing instruction information, to function as a unit for activating the processor, and a unit for activating the second image capturing apparatus in preference to the first image capturing apparatus when the processor is activated.

With the radiation image capturing system, the method of capturing radiation image, and the program according to the present invention, even when no electric power is supplied to the image capturing apparatus, the image capturing apparatus can quickly be activated when the processor is activated. Therefore, the radiation image capturing system is capable of handling interrupts for emergency image capturing requests.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A radiation image capturing system according to an embodiment of the present invention will be described below with reference to FIGS. 1 through 11.

Figure 1:
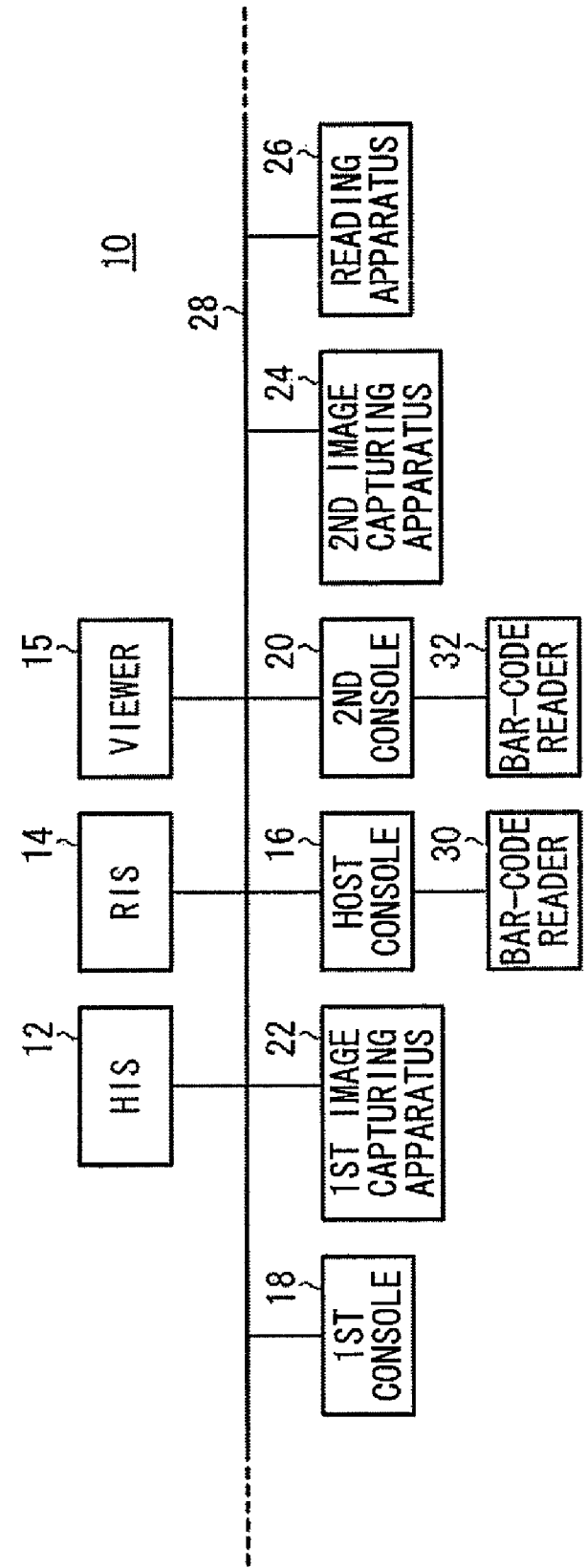
FIG. 1 is a block diagram of a radiation image capturing system according to an embodiment of the present invention.
Figure 2:
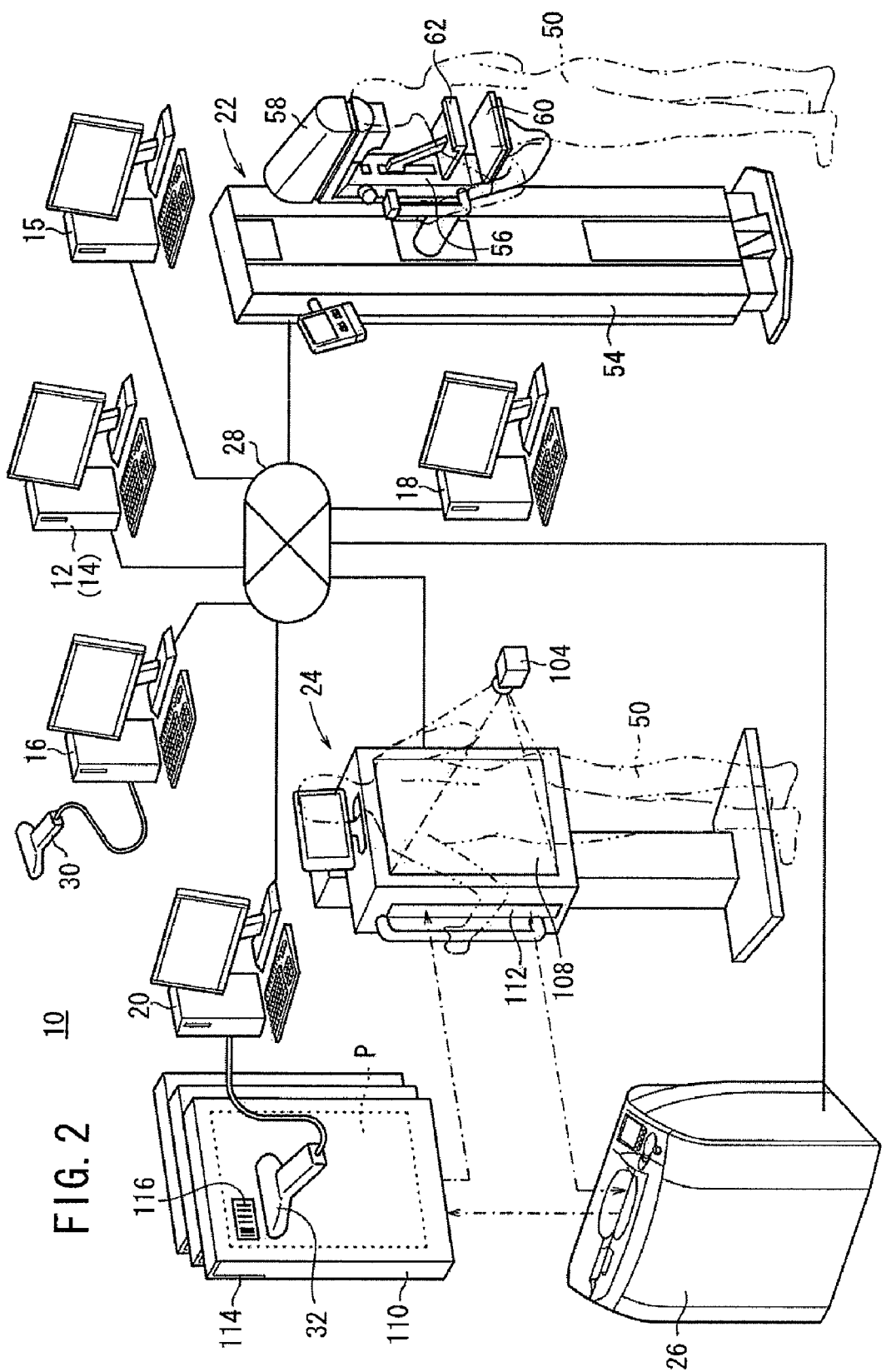
FIG. 2 is a schematic perspective view of the radiation image capturing system shown in FIG. 1.

FIGS. 1 and 2 show a configuration of a radiation image capturing system 10 according to an embodiment of the present invention. As shown in FIGS. 1 and 2, the radiation image capturing system 10 comprises a hospital information system (HIS) 12 for managing medical information processing (including medical coding) in a hospital, a radiology information system (RIS) 14 for managing radiation image capturing processes performed in the radiological department of the hospital under the management of the HIS 12, a viewer 15 for displaying radiation images to be interpreted by the doctor for diagnosis, a host console (processor) 16 placed in a control room near image capturing rooms in the radiological department, for managing various image capturing apparatus of different specifications, a first console 18 and a second console 20 placed in the control room for controlling particular image capturing apparatus, respectively, a first image capturing apparatus 22 for being controlled by the first console 18, a second image capturing apparatus 24 for being controlled by the second console 20, and a reading apparatus 26 for being controlled by the second console 20 to read radiation image information captured by the second image capturing apparatus 24. The above components of the radiation image capturing system 10 are interconnected by an in-house network 28 in the hospital. If necessary, other consoles, other image capturing apparatus, and components may also be connected to the in-house network 28.

The host console 16 acquires patient information such as the name, gender, age, etc. of a patient which has been set using the HIS 12, and image capturing instruction information such as a method of capturing a radiation image, a body region to be imaged, and an image capturing apparatus to be used to capture a radiation image, which has been set by the doctor or radiological technician using the RIS 14, through the in-house network 28, and supplies the acquired information to the first console 18 or the second console 20. The host console 16 may be programmed to perform the processing sequence of the first console 18 or the second console 20. If the host console 16 is programmed to perform the processing sequence of the first console 18 or the second console 20, then since the first console 18 or the second console 20 may be dispensed with, the radiation image capturing system will become less costly. To the host console 16 and the second console 20, there are connected respective bar-code readers 30, 32 for acquiring ID information for identifying a radiation detector, described later, to be used in the second image capturing apparatus 24.

Figure 3:
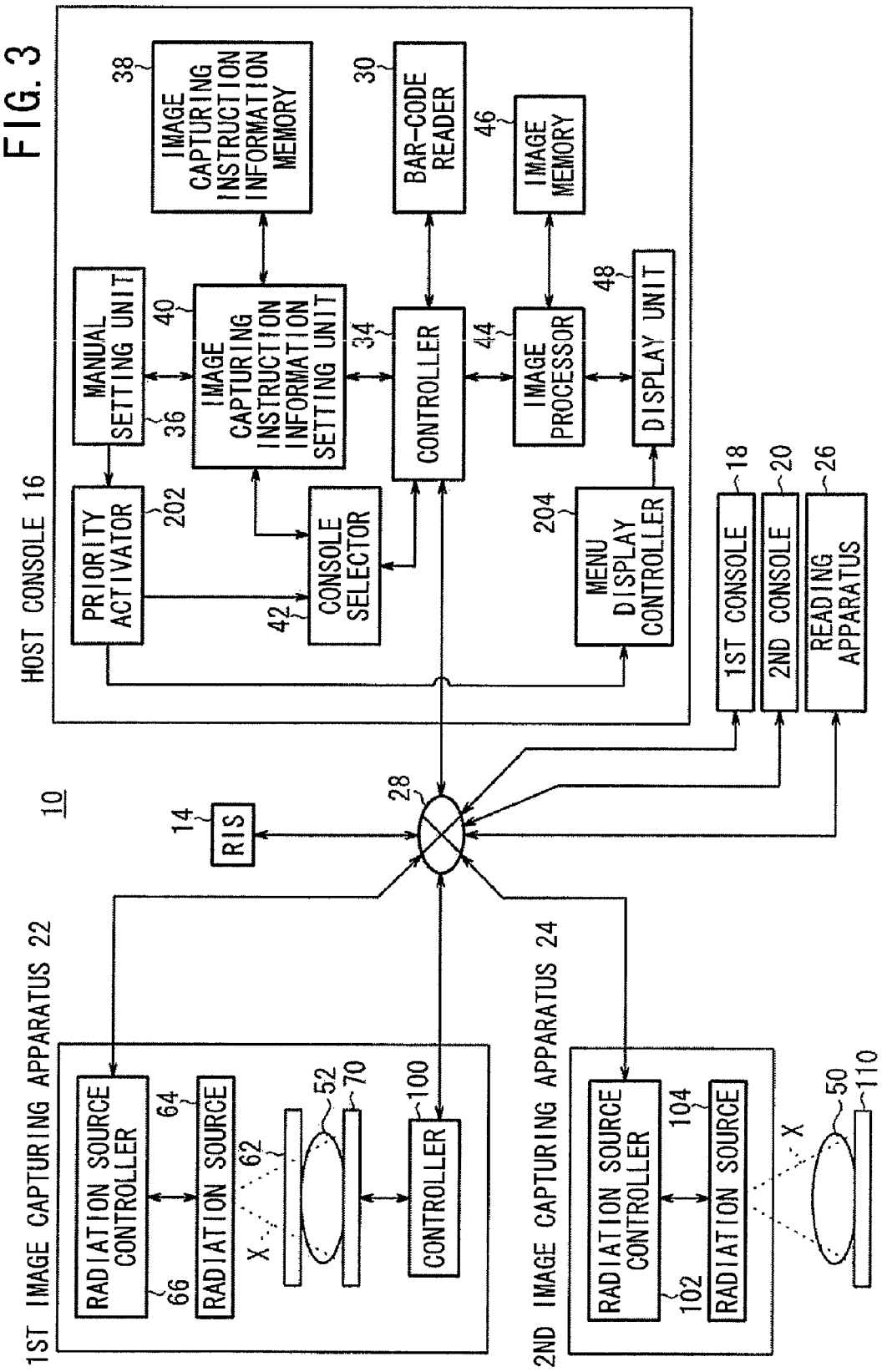
FIG. 3 is a block diagram of an assembly of a host console, a first image capturing apparatus, and a second image capturing apparatus of the radiation image capturing system.

FIG. 3 shows in block form an assembly of the host console 16, the first image capturing apparatus 22, and the second image capturing apparatus 24.

The host console 16 has a controller 34 which sends information to and receives information from the RIS 14, the first console 18, the second console 20, the first image capturing apparatus 22, the second image capturing apparatus 24, and the reading apparatus 26 through the in-house network 28. The host console 16 comprises a manual setting unit 36, an image capturing instruction information setting unit 40 for setting image capturing instruction information through manual setting unit 36 or receiving image capturing instruction information set by the RIS 14 and storing the image capturing instruction information in an image capturing instruction information memory 38, a console selector 42 for selecting the first console 18 or the second console 20 for processing radiation image information according to the set image capturing instruction information and supplying the corresponding image capturing instruction information to the first console 18 or the second console 20 which has been selected, an image processor 44 for processing radiation image information acquired from the first image capturing apparatus 22 or the second image capturing apparatus 24, an image memory 46 for storing the radiation image information, and a display unit 48 for displaying the radiation image information.

The first console 18 and the second console 20 have essentially the same functions as the host console 16 except for the controller 34 for acquiring image capturing instruction information from the RIS 14 and the console selector 42. The first console 18 is connected to a display unit for displaying a menu screen for the first image capturing apparatus 22, image capturing instruction information acquired by a controller, radiation image information from the first image capturing apparatus 22, etc. The second console 20 is connected to a display unit for displaying a menu screen for the second image capturing apparatus 24, acquired image capturing instruction information, radiation image information from the reading apparatus 26, etc.

The configurations of the host console 16, the first console 18, and the second console 20 may not necessarily be different from each other, but may be identical to each other.

The first image capturing apparatus 22 is a mammographic apparatus for capturing a radiation image of a breast 52 of a subject (patient) 50. As shown in FIG. 2, the first image capturing apparatus 22 comprises a radiation source housing 58 disposed on an upper end of an arm 56 that is swingably coupled to a base 54, an image capturing base 60 disposed on a lower end of the arm 56, and a compression plate 62 movably mounted on the arm 56 for movement toward and away from the image capturing base 60.

The radiation source housing 58 houses therein a radiation source 64 for emitting a radiation X. The radiation source 64 has its tube voltage, tube current, and irradiation time of the radiation x controlled by a radiation source controller 66 for irradiating the breast 52 of the subject 50 with the radiation x at a given dose depending on the body region to be imaged.

Figure 4:
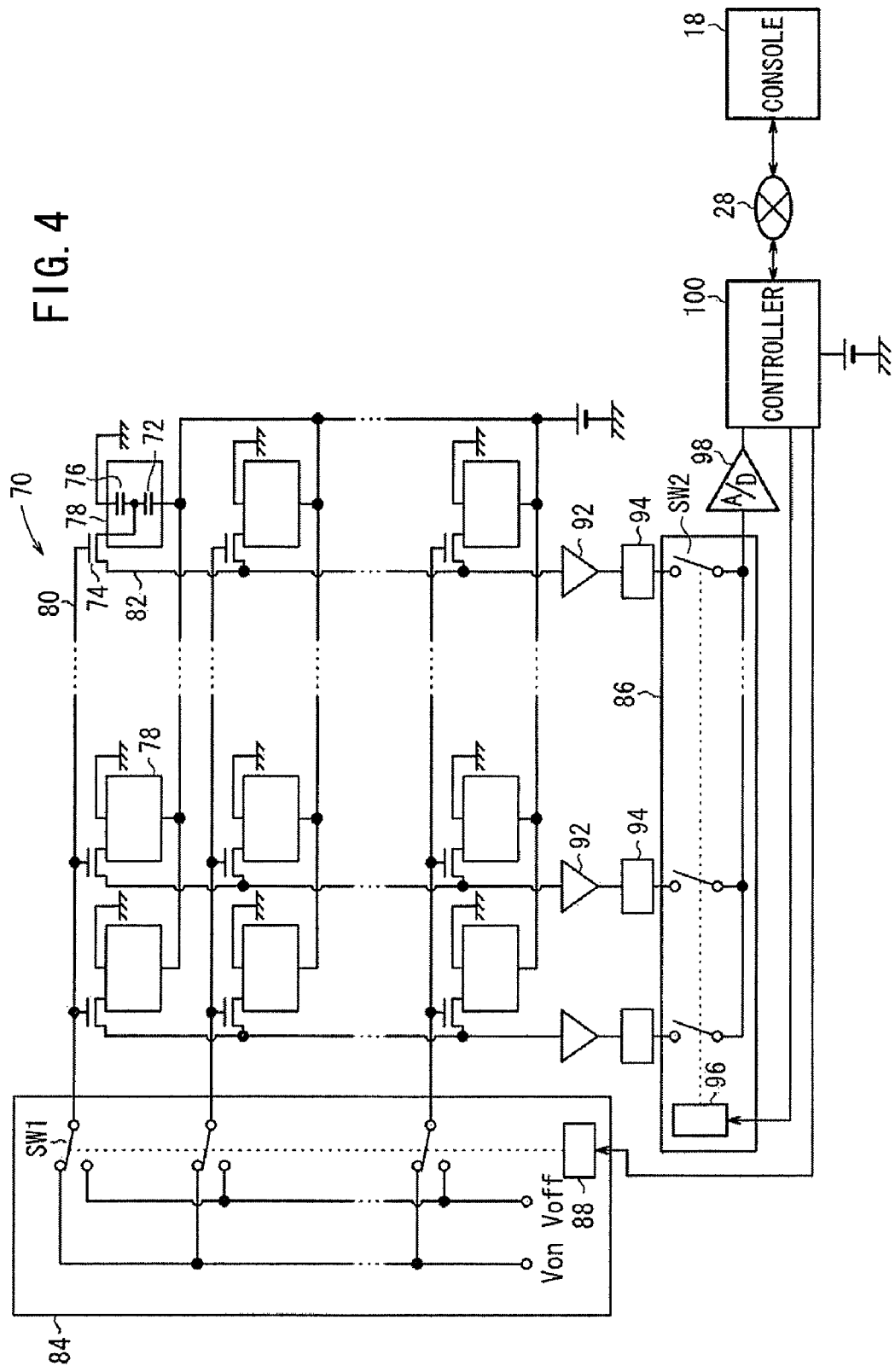
FIG. 4 is a block diagram of a circuit arrangement of a radiation detector used in the radiation image capturing system.

The image capturing base 60 houses therein a radiation detector 70 which has a circuit arrangement shown in FIG. 4.

The radiation detector 70 comprises an array of thin-film transistors (TFTS) 74 arranged in rows and columns, a photoelectric conversion layer 72 made of a material such as amorphous selenium (a-Se) for generating electric charges upon detection of a radiation, the photoelectric conversion layer 72 being disposed over the array of TFTs 74, and an array of storage capacitors 76 connected to the photoelectric conversion layer 72. When the radiation is applied to the radiation detector 70, the photoelectric conversion layer 72 generates electric charges, and the storage capacitors 76 store the generated electric charges. Then, the TFTs 74 are turned on along each row at a time to read the electric charges from the storage capacitors 76 as an image signal. In FIG. 4, the photoelectric conversion layer 72 and one of the storage capacitors 76 are shown as a pixel 78, and the pixel 78 is connected to one of the TFTs 74. Details of the other pixels 78 are omitted from illustration. Since amorphous selenium tends to change its structure and lose its function at high temperatures, it needs to be used within a certain temperature range. Therefore, some means for cooling the radiation detector 70 should preferably be provided in the image capturing base 60.

The TFTs 74 connected to the respective pixels 78 are connected to respective gate lines 80 extending parallel to the rows and respective signal lines 82 extending parallel to the columns. The gate lines 80 are connected to a line scanning driver 84, and the signal lines 82 are connected to a multiplexer 86 serving as a reading circuit.

The gate lines 80 are supplied with control signals Von, Voff for turning on and off the TFTs 74 along the rows from the line scanning driver 84. The line scanning driver 84 comprises a plurality of switches SW1 for switching between the gate lines 80 and an address decoder 88 for outputting a selection signal for selecting one of the switches SW1 at a time. The address decoder 88 is supplied with an address signal from a controller 100.

The signal lines 82 are supplied with electric charges stored in the storage capacitors 76 of the pixels 78 through the TFTs 74 arranged in the columns. The electric charges supplied to the signal lines 82 are amplified by amplifiers 92 connected respectively to the signal lines 82. The amplifiers 92 are connected through respective sample and hold circuits 94 to the multiplexer 86. The multiplexer 86 comprises a plurality of switches SW2 for successively switching between the signal lines 82 and an address decoder 96 for outputting a selection signal for selecting one of the switches SW2 at a time. The address decoder 96 is supplied with an address signal from the controller 100. The multiplexer 86 has an output terminal connected to an A/D converter 98. A radiation image signal generated by the multiplexer 86 based on the electric charges from the sample and hold circuits 94 is converted by the A/D converter 98 into a digital image signal representing radiation image information, which is supplied to the controller 100. The controller 100 supplies the acquired radiation image information through the in-house network 28 to the first console 18 which controls the first image capturing apparatus 22.

The first image capturing apparatus 22 may not be the mammographic apparatus described above, but may be of a design wherein the radiation detector 70 is removably or fixedly housed in an upstanding image capturing base or a recumbent image capturing base.

The second image capturing apparatus 24 is an upstanding image capturing apparatus for capturing a radiation image of the chest or the like of a subject 50. The second image capturing apparatus 24 comprises a radiation source 104 for being controlled by a radiation source controller 102 and an image capturing base 108 disposed in confronting relation to the radiation source 104. The image capturing base 108 has a slot 112, defined in a side wall thereof, through which a cassette 110 housing a stimulable phosphor panel P therein can be loaded into the image capturing base 108. The second image capturing apparatus 24 is controlled by the second console 20 through the in-house network 28.

The stimulable phosphor panel P comprises a support body and a stimulable phosphor layer disposed on the support body. The stimulable phosphor layer stores the energy of a radiation X that is applied thereto. When the stimulable phosphor layer is irradiated with stimulating light, it emits stimulated light depending on the stored energy. When the stimulable phosphor layer is irradiated with erasing light, it discharges any remaining energy stored therein and can be reused.

The stimulable phosphor panel P housed in the cassette 110 is removable from the cassette 110 when a lid member 114 on the cassette 110 is opened. A bar code 116 which records therein identification information including an identification number for identifying the stimulable phosphor panel P housed in the cassette 110, the size of the stimulable phosphor panel P, the sensitivity of the stimulable phosphor panel P, etc. is applied to an outer surface of the cassette 110. The bar code 116 can be read by the bar-code reader 32 connected to the second console 20 or the bar-code reader 30 connected to the host console 16.

Figure 5:
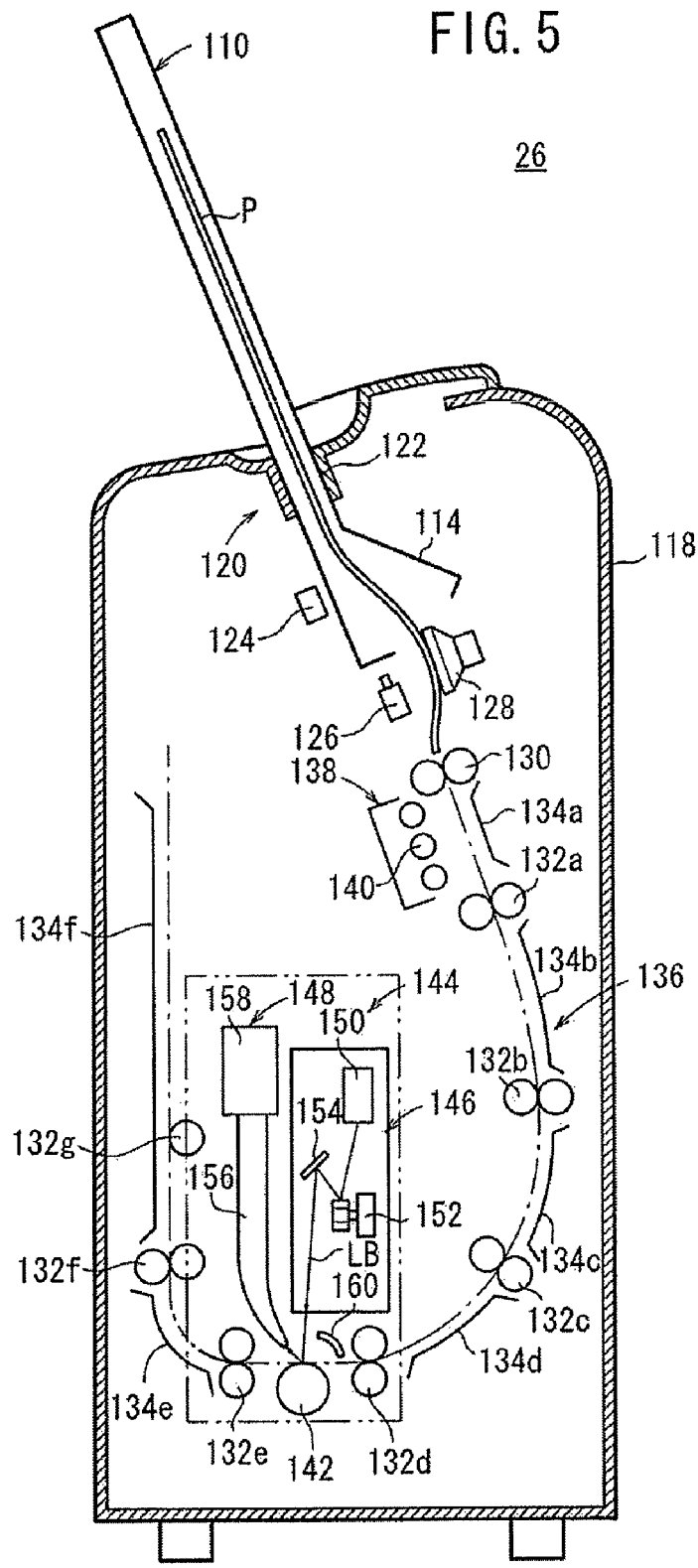
FIG. 5 is a vertical cross-sectional view of a reading apparatus of the radiation image capturing system.

Radiation image information that has been recorded in the stimulable phosphor panel P is read by the reading apparatus 26 which is constructed as shown in FIG. 5. The reading apparatus 26 as well as the second image capturing apparatus 24 is controlled by the second console 20 through the in-house network 28.

As shown in FIG. 5, the reading apparatus 26 has a cassette loader 120 disposed in an upper portion of a casing 118 and having a loading slot 122 for receiving therein the cassette 110 which houses therein the stimulable phosphor panel P with recorded radiation image information. The casing 118 of the reading apparatus 26 accommodates therein, near the loading slot 122, a bar-code reader 124 for reading the identification information recorded in the bar code 116 on the cassette 110, an unlock mechanism 126 for unlocking the lid member 114 of the cassette 110, a suction cup 128 for attracting and removing the stimulable phosphor panel P from the cassette 110 at the time the lid member 114 is opened, and a pair of nip rollers 130 for gripping and feeding the stimulable phosphor panel P removed by the suction cup 128.

The nip rollers 130 are followed by a plurality of feed rollers 132a through 132g and a plurality of guide plates 134a through 134f which jointly make up a curved feed path 136. The curved feed path 136 extends downwardly from the cassette loader 120, then extends substantially horizontally at its lowermost portion, and then extends substantially vertically upwardly. The curved feed path 136 thus shaped is effective to make the reading apparatus 26 small in size.

Between the nip rollers 130 and the feed rollers 132a, there is disposed an erasing unit 138 for erasing radiation image information remaining in the stimulable phosphor panel P from which desired radiation image information has been read. The erasing unit 138 has a plurality of erasing light sources 140 such as cold cathode tubes or the like for emitting erasing light.

A platen roller 142 is disposed between the feed rollers 132d, 132e which are positioned in the lowermost portion of the curved feed path 136. The platen roller 142 is disposed beneath a scanning unit 144 for reading the desired radiation image information recorded in the stimulable phosphor panel P.

The scanning unit 144 comprises a stimulator 146 for emitting a laser beam LB as stimulating light to scan the stimulable phosphor panel P and a reader 148 for reading stimulated light emitted from the stimulable phosphor panel P which is stimulated by the laser beam LB, the stimulated light being representative of the radiation image information.

The stimulator 146 comprises a laser oscillator 150 for outputting the laser beam LB, a rotary polygon mirror 152 for deflecting the laser beam LB in a main scanning direction across the stimulable phosphor panel P, and a reflecting mirror 154 for reflecting the laser beam LB to the stimulable phosphor panel P as it passes over the platen roller 142.

The reader 148 comprises a light guide 156 having a lower end disposed near the stimulable phosphor panel P over the platen roller 142, and a photomultiplier 158 connected to an upper end of the light guide 156 for converting the stimulated light from the stimulable phosphor panel P into an electric signal which represents the radiation image information stored in the stimulable phosphor panel P. A light collecting mirror 160 for collecting the stimulated light from the stimulable phosphor panel P is disposed near the lower end of the light guide 156. The photomultiplier 158 supplies the electric signal representing the radiation image information to the second console 20 through the in-house network 28.

In addition to the first image capturing apparatus 22, which is a mammographic apparatus, loaded with the radiation detector 70 shown in FIG. 4, another mammographic apparatus which employs the cassette 110 housing the stimulable phosphor panel P shown in FIG. 2 may be connected to the in-house network 28. Similarly, in addition to the second image capturing apparatus 24 which employs the stimulable phosphor panel P shown in FIG. 2, an upstanding image capturing apparatus which employs the radiation detector 70 shown in FIG. 4 may be connected to the in-house network 28. Moreover, a recumbent image capturing apparatus which employs the radiation detector 70 or the stimulable phosphor panel P may be connected to the in-house network 28. Furthermore, image capturing apparatus of other specifications, such as a CT apparatus, an MR apparatus, etc. may also be connected to the in-house network 28, and consoles (processors) for controlling these image capturing apparatus may also be connected to the in-house network 28.

Figure 6:
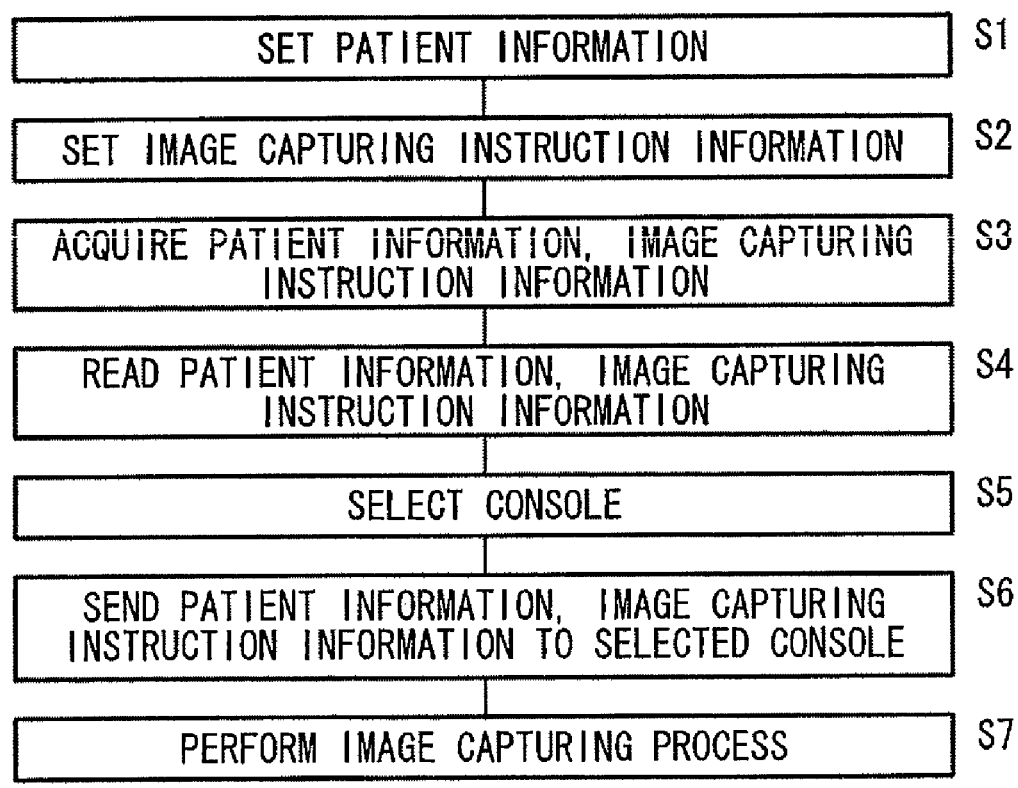
FIG. 6 is a flowchart of a normal operating sequence of the radiation image capturing system.
Figure 7:
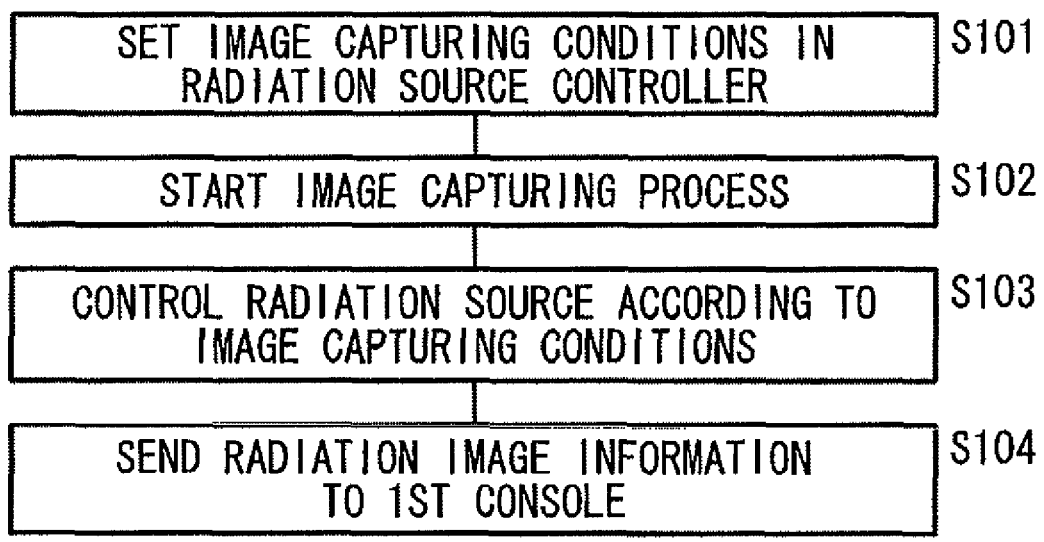
FIG. 7 is a flowchart of an operating sequence of the radiation image capturing system for controlling the first image capturing apparatus with a first console.
Figure 8:
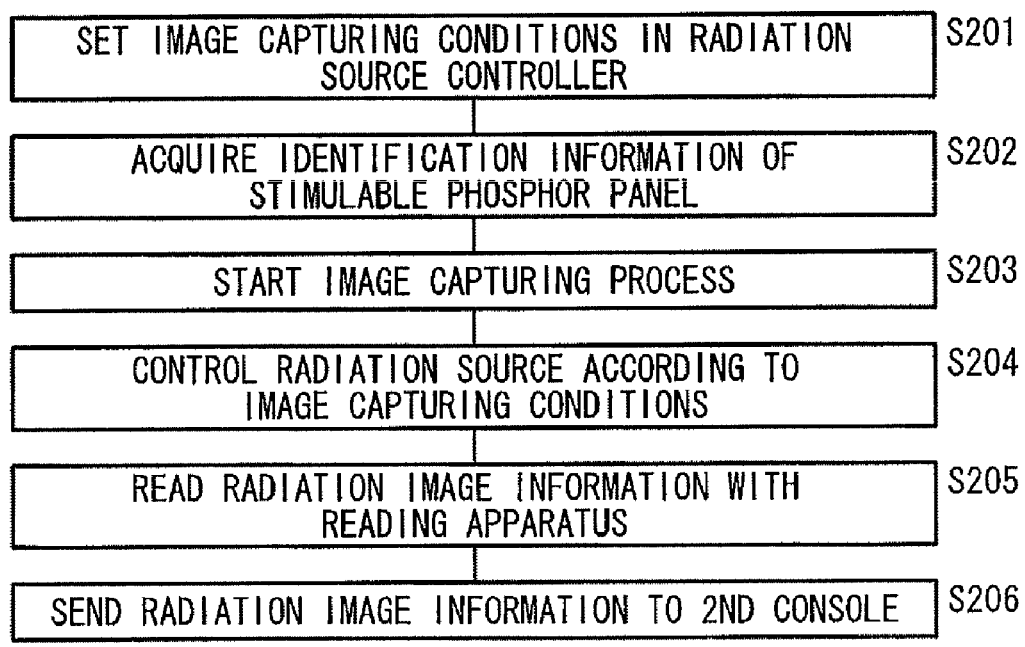
FIG. 8 is a flowchart of an operating sequence of the radiation image capturing system for controlling the second image capturing apparatus with a second console.

A normal operating sequence of the radiation image capturing system 10 at the time the entire system 10 is being energized will be described below with reference to FIGS. 6 through 8.

First, patient information such as the name, gender, age, etc. of a patient is set using the HIS 12 (step S1 in FIG. 6), and image capturing instruction information such as a method of capturing a radiation image, a body region to be imaged, and an image capturing apparatus to be used to capture a radiation image, is set in relation to the patient information using the RIS 14 (step S2).

The controller 34 of the host console 16 that is installed in the radiological department acquires the patient information and the image capturing instruction information from the RIS 14 via the in-house network 28 (step S3). The radiological technician sets and changes the image capturing instruction information using the manual setting unit 36 of the host console 16, if necessary. For example, the radiological technician changes from an image capturing apparatus set by the doctor using the RIS 14 to an image capturing apparatus suitable for a body region to be imaged and the condition of the patient. The image capturing instruction information setting unit 40 temporarily stores the patient information and the image capturing instruction information which have been acquired or the image capturing instruction information which has been changed or newly set into the image capturing instruction information memory 38.

Then, the image capturing instruction information setting unit 40 of the host console 16 reads the patient information and the image capturing instruction information from the image capturing instruction information memory 38 (step S4). The console selector 42 selects the first console 18 for controlling the first image capturing apparatus 22, the second console 20 for controlling the second image capturing apparatus 24, or another console connected to the in-house network 28 according to the read image capturing instruction information (step S5).

At this time, the console selector 42 determines whether the processor for controlling the image capturing apparatus that is indicated by the image capturing instruction information is capable of performing its processing sequence or not. For example, if the processor is controlling the image capturing apparatus to perform an image capturing process or is processing radiation image information acquired from the image capturing apparatus, and hence is unable to immediately perform a next cycle of processing sequence, then the console selector 42 judges that the processor is incapable of performing its processing sequence. Furthermore, if the processor is suffering a failure or the image capturing apparatus controlled by the processor is suffering a failure, then the console selector 42 also judges that the processor is incapable of performing its processing sequence. When the processor is judged as being incapable of performing its processing sequence, the console selector 42 searches for another processor which is capable of capturing radiation image information according to the image capturing instruction information and also of performing its processing sequence.

After the processor capable of performing its processing sequence is selected, the controller 34 of the host console 16 sends the patient information and the image capturing instruction information to the first console 18, the second console 20, or another console which has been selected (step S6), confirms the completion of the sending of the patient information and the image capturing instruction information, and deletes the patient information and the image capturing instruction information from the image capturing instruction information memory 38.

If the image capturing instruction information represents the capturing of a chest image of the subject 50, then the console selector 42 selects the second console 20 for controlling the second image capturing apparatus 24 for capturing a chest image, and sends the patient information and the image capturing instruction information to the second console 20. If the image capturing instruction information represents the capturing of an image of the breast 52 of the subject 50, then the console selector 42 selects the first console 18 for controlling the first image capturing apparatus 22 for capturing an image of the breast 52, and sends the patient information and the image capturing instruction information to the first console 18.

Another console selection mode will be described below. When the subject 50 whose chest image is to be captured uses a wheelchair, then the subject 50 cannot be positioned with respect to the image capturing base 108 of the second image capturing apparatus 24 shown in FIG. 2. In this case, if an image capturing apparatus which is capable of handling the subject 50 who uses a wheelchair is connected to the in-house network 28, then the console selector 42 selects that image capturing apparatus according to the patient information, and sends the image capturing instruction information to the console which controls the image capturing apparatus.

According to still another console selection mode, an image of a body region of the subject 50 is captured by the first image capturing apparatus 22, and an image of another body region of the subject 50 is captured by the second image capturing apparatus 24. In this case, the console selector 42 selects the corresponding consoles according to the image capturing instruction information for the body regions to be imaged, and sends selected items of the patient information and the image capturing instruction information to the consoles.

If the host console 16 serves as a processor capable of performing processing sequences for a plurality of image capturing apparatus of different specifications, then the host console 16 may be selected as a console, instead of the first console 18 or the second console 20, for performing a processing sequence for the first image capturing apparatus 22 or the second image capturing apparatus 24.

The console to which the patient information and the image capturing instruction information have been sent now performs a process of capturing radiation image using the image capturing apparatus under its control, according to the image capturing instruction information (step S7).

First, a process of capturing radiation image of the breast 52 of the subject 50 with the first image capturing apparatus 22 controlled by the first console 18 will be described below with reference to a flowchart of FIG. 7.

When the first console 18 receives the image capturing instruction information from the host console 16, the first console 18 sets a tube voltage, a tube current, and an irradiation time, i.e., image capturing conditions included in the image capturing instruction information, in the radiation source controller 66 of the first image capturing apparatus 22 (step S101).

The radiological technician operates the first image capturing apparatus 22 to make it ready for an image capturing process. Specifically, the radiological technician turns the arm 56 to set an image capturing direction, and then positions the breast 52 of the subject 50 on the image capturing base 60. The radiological technician moves the compression plate 62 toward the image capturing base 60, positioning the breast 52 securely in place on the image capturing base 60.

Then, the radiological technician operates an image capturing switch, not shown, to start an image capturing process (step S102). The radiation source controller 66 controls the radiation source 64 according to the set image capturing conditions (step S103) to apply the radiation X to the breast 52 through the compression plate 62. The radiation X that has passed through the breast 52 is applied to the radiation detector 70.

The radiation X is converted into electric signals by the photoelectric conversion layer 72 of the pixels 78 of the radiation detector 70 (FIG. 4). The electric signals are stored as electric charges in the storage capacitors 76. The stored electric charges, which represent radiation image information of the breast 52 of the subject 50, are read from the storage capacitors 76 according to address signals which are supplied from the controller 100 to the line scanning driver 84 and the multiplexer 86.

Specifically, in response to the address signal supplied from the controller 100, the address decoder 88 of the line scanning driver 84 outputs a selection signal so as to select one of the switches SW1, which supplies the control signal Von to the gates of the TFTs 74 connected to the gate line 80 corresponding to the selected switch SW1. In response to the address signal supplied from the controller 100, the address decoder 96 of the multiplexer 86 outputs a selection signal, which operates to successively turn on the switches SW2 so as to switch between the signal lines 82, for thereby reading the electric charges stored in the storage capacitors 76 of the pixels 78 connected to the selected gate line 80, through the signal lines 82.

The electric charges (radiation image information) read from the storage capacitors 76 of the pixels 78 connected to the selected gate line 80 are amplified by the respective amplifiers 92, sampled by the sample and hold circuits 94, and supplied to the multiplexer 86. Based on the supplied electric charges, the multiplexer 86 generates and supplies a radiation image signal to the A/D converter 98, which converts the radiation image signal into a digital signal. The digital signal which represents the radiation image information is transmitted from the controller 100 to the first console 18 through the in-house network 28 (step S104).

Similarly, the address decoder 88 of the line scanning driver 84 successively turns on the switches SW1 to switch between the gate lines 80 according to the address signal supplied from the controller 100. The electric charges stored in the storage capacitors 76 of the pixels 78 connected to the successively selected gate lines 80 are read through the signal lines 82, and processed by the multiplexer 86 and the A/D converter 98 into digital signals, which are transmitted from the controller 100 to the first console 18 through the in-house network 28 (step S104).

The first console 18 processes the radiation image information represented by the received digital signals depending on the specifications of the first image capturing apparatus 22. Then, the first console 18 displays a radiation image based on the processed radiation image information for the radiological technician to confirm the radiation image, and then transmits the radiation image information to the viewer 15 through the in-house network 28. The doctor then interprets for diagnosis a radiation image that is displayed by the viewer 15 based on the radiation image information. If the first console 18 is processing other radiation image information that has already been received thereby, then the console selector 42 of the host console 16 searches for another processor capable of performing its processing sequence, and sends the radiation image information acquired from the first image capturing apparatus 22 to the retrieved other processor to process the radiation image information.

A process of capturing a chest image of the subject 50 with the second image capturing apparatus 24 controlled by the second console 20 will be described below with reference to a flowchart of FIG. 8.

When the second console 20 receives the image capturing instruction information from the host console 16, the second console 20 sets a tube voltage, a tube current, and an irradiation time, i.e., image capturing conditions included in the image capturing instruction information, in the radiation source controller 102 of the second image capturing apparatus 24 (step S201).

The radiological technician uses the bar-code reader 32 connected to the second console 20 to read the bar code 116 attached to the cassette 110, thereby acquiring identification information including an identification number for identifying the stimulable phosphor panel P housed in the cassette 110, the size of the stimulable phosphor panel P, the sensitivity of the stimulable phosphor panel P, etc. (step S202).

After having loaded the cassette 110 into the slot 112 of the second image capturing apparatus 24, the radiological technician operates an image capturing switch, not shown, to start an image capturing process (step S203). The radiation source controller 102 controls the radiation source 104 according to the set image capturing conditions (step S204) to apply the radiation X to the subject 50. The radiation X that has passed through the subject 50 is applied to the stimulable phosphor panel P housed in the cassette 110. As a result, radiation image information of the subject 50 is recorded in the stimulable phosphor panel P.

The radiological technician then removes the cassette 110 housing therein the stimulable phosphor panel P with the recorded radiation image information, from the second image capturing apparatus 24, and thereafter loads the cassette 110 into the cassette loader 120 of the reading apparatus 26.

When the cassette 110 is loaded into the cassette loader 120, the bar-code reader 124 in the cassette loader 120 reads the bar code 116 attached to the cassette 110 to acquire the identification information including the identification number, the size, the sensitivity, etc. of the stimulable phosphor panel P. The acquired identification information is compared with the identification information read by the bar-code reader 32 connected to the second console 20 to confirm the correspondence between the subject 50 and the radiation image information.

After the identification information is read, the unlock mechanism 126 is actuated to unlock and open the lid member 114. The suction cup 128 attracts the stimulable phosphor panel P, removes the stimulable phosphor panel P out of the cassette 110, and feeds the stimulable phosphor panel P between the nip rollers 130. The stimulable phosphor panel P which is gripped by the nip rollers 130 is then fed to a position beneath the scanning unit 144 through the curved feed path 136 made up of the feed rollers 132a through 132g and the guide plates 134a through 134f.

Beneath the scanning unit 144, the stimulable phosphor panel P is fed substantially horizontally in an auxiliary scanning direction by the feed rollers 132d, 132e. At the same time, the laser beam LB output from the laser oscillator 150 of the stimulator 146 is reflected and deflected by the polygon mirror 152 that is rotating at a high speed, and then guided by the reflecting mirror 154 to the stimulable phosphor panel P whose lower surface is supported by the platen roller 142, thereby scanning the stimulable phosphor panel P in a main scanning direction.

By being irradiated with the laser beam LB, the stimulable phosphor panel P is stimulated to emit stimulated light representative of the radiation image information recorded therein. The stimulated light is applied directly or via the light collecting mirror 160 to the lower end of the light guide 156 which is disposed near the stimulable phosphor panel P and extends in the main scanning direction. The stimulated light which has entered the light guide 156 is repeatedly reflected in the light guide 156 and guided to the photomultiplier 158. The photomultiplier 158 converts the stimulated light into an electric signal representative of the radiation image information recorded in the stimulable phosphor panel P. In this manner, the radiation image information recorded in the stimulable phosphor panel P is read by the scanning unit 144 of the reading apparatus 26 (step S205).

The radiation image information thus read by the scanning unit 144 is transmitted to the second console 20 through the in-house network 28 (step S206). The second console 20 processes the received radiation image information depending on the specifications of the second image capturing apparatus 24. Then, the second console 20 displays a radiation image based on the processed radiation image information for the radiological technician to confirm the radiation image, and then transmits the radiation image information to the viewer 15 through the in-house network 28. The doctor then interprets for diagnosis a radiation image that is displayed by the viewer 15 based on the radiation image information. If the second console 20 is processing other radiation image information that has already been received thereby, then the console selector 42 of the host console 16 searches for another processor capable of performing its processing sequence, and sends the radiation image information acquired from the second image capturing apparatus 24, to the retrieved other processor to process the radiation image information.

Characteristic configurational and operational details of the radiation image capturing system 10 according to the present embodiment will be described below with reference to FIGS. 3 and 9.

Figure 9:
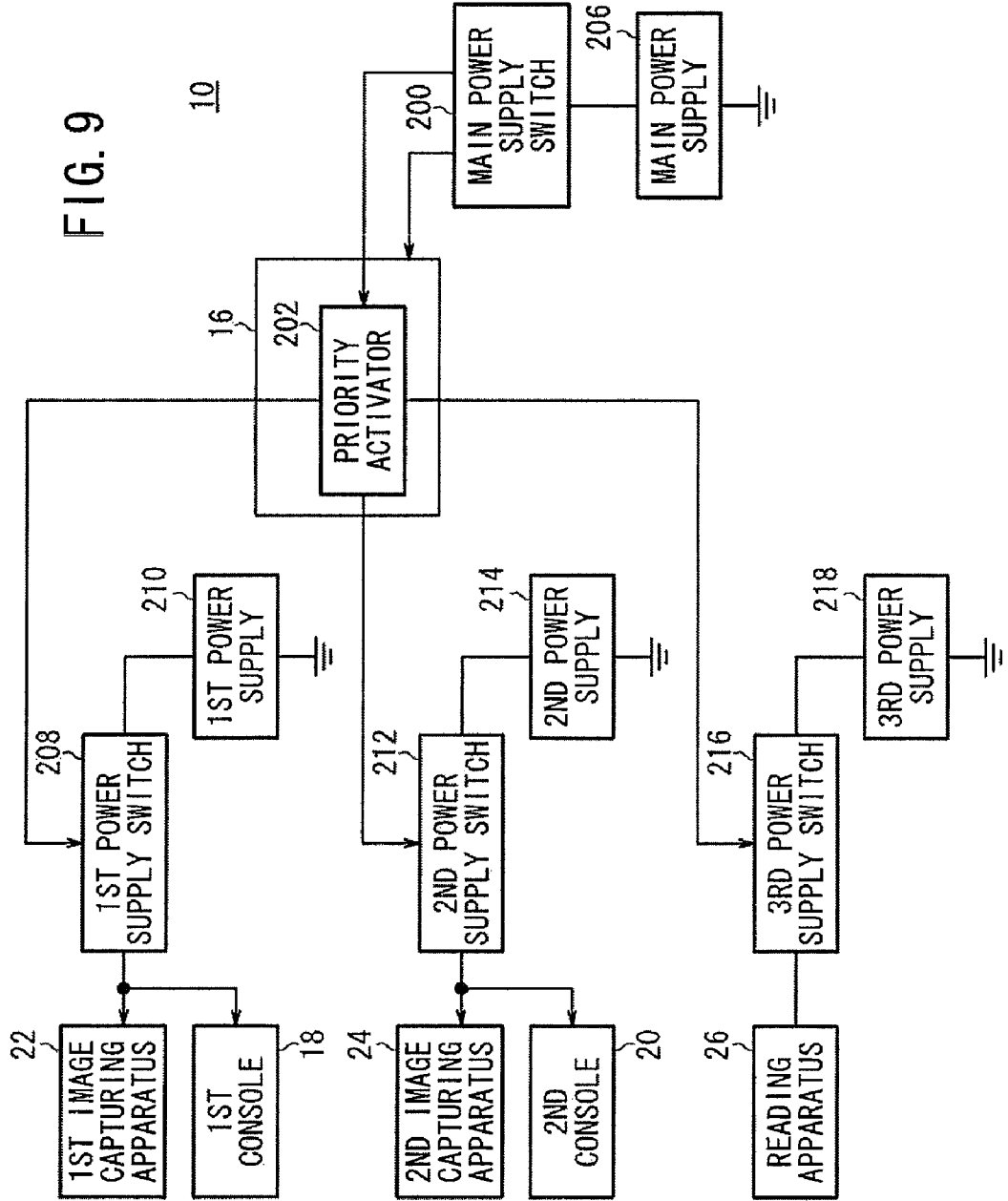
FIG. 9 is a block diagram showing functions of a priority activator.

As shown in FIGS. 3 and 9, the radiation image capturing system 10 includes a priority activator 202 which is activated when a main power supply switch 200 in the manual setting unit 36 is turned on, and a menu display controller 204 which is activated by the priority activator 202.

Figure 10:
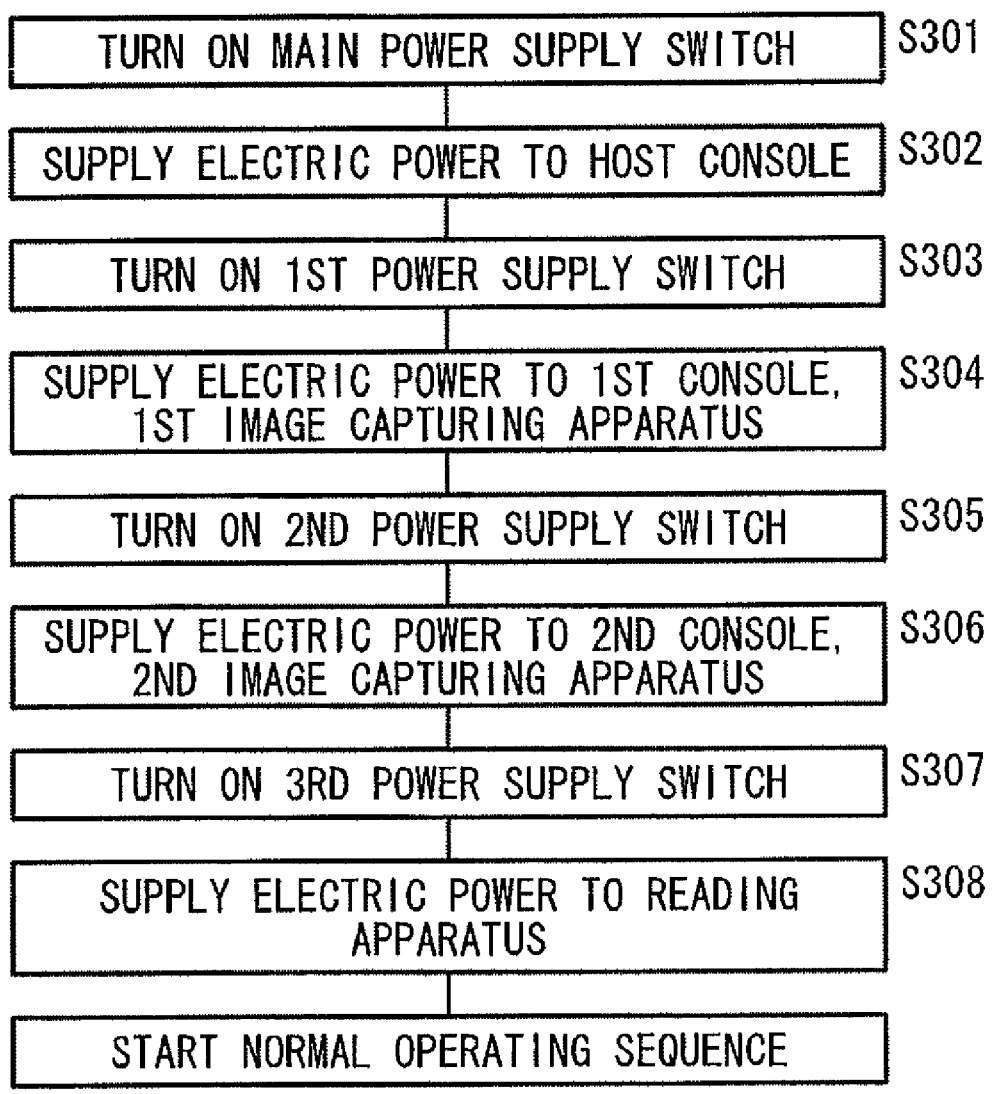
FIG. 10 is a flowchart of a processing sequence from turning on of a main power supply switch to starting of the normal operating sequence.
Figure 11:
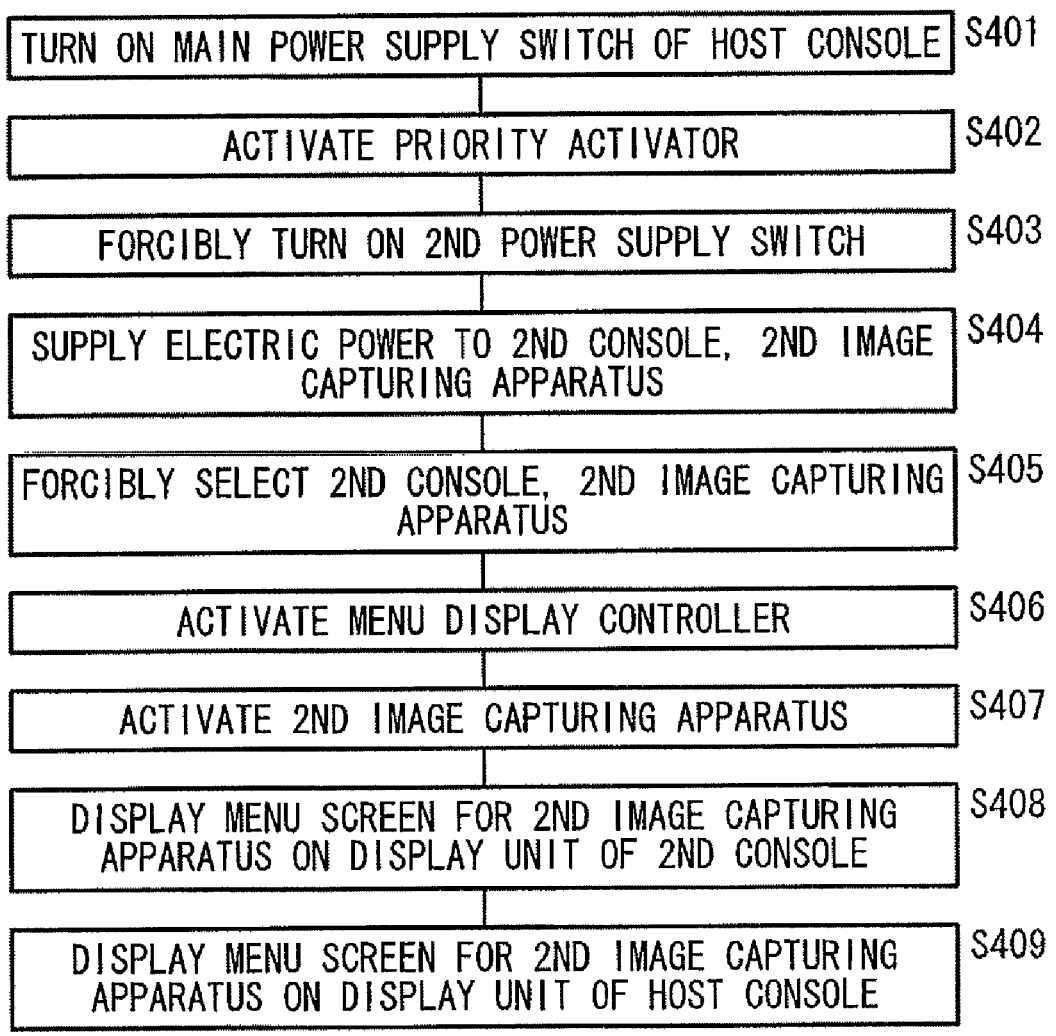
FIG. 11 is a flowchart of a processing sequence of the priority activator.

Various functions of the priority activator 202 and the menu display controller 204 will be described below also with reference to FIGS. 10 and 11.

When the main power supply switch 200 is turned on (step S301 shown in FIG. 10), a main power supply 206 supplies electric power to the host console 16 (step S302). When a first power supply switch 208 is turned on (step S303), a first power supply 210 supplies electric power to the first console 18 and the corresponding first image capturing apparatus 22 (step S304). When a second power supply switch 212 is turned on (step S305), a second power supply 214 supplies electric power to the second console 20 and the corresponding second image capturing apparatus 24 (step S306). When a third power supply switch 216 is turned on (step S307), a third power supply 218 supplies electric power to the reading apparatus 26 (step S308). In this manner, the radiation image capturing system 10 performs the normal operating sequence described above.

If the radiation image capturing system 10 is not supplied with electric power from the main power supply 206, the first power supply 210, the second power supply 214, and the third power supply 218, then a problem arises as to how the radiation image capturing system 10 should capture emergency radiation images of urgent patients.

Since the first image capturing apparatus 22 incorporates the radiation detector having the photoelectric conversion layer 72 made of a material such as amorphous selenium (a-Se) which detects a radiation applied thereto and generates corresponding electric charges, it takes time until the supply of electric power to the first image capturing apparatus 22 becomes stable after the first power supply switch 208 has been turned on. In addition, the first image capturing apparatus 22 needs to be calibrated each time it is activated. For these reasons, it takes about 30 minutes to 1 hour before the first image capturing apparatus 22 can be used to capture radiation images after it has been activated.

On the other hand, the second image capturing apparatus 24 which employs the stimulable phosphor panel P becomes operational when the second power supply switch 212 is turned on, and the reading apparatus 26 is activated by the third power supply switch 216 that is turned on. Since the reading apparatus 26 is activated in about 1 minute, the second image capturing apparatus 24 becomes operational in about 1 minute after the second power supply switch 212 has been turned on. Since the radiation source 104 takes about 8 minutes until it becomes stable, the second image capturing apparatus 24 has virtually no waiting time for operation.

When the main power supply switch 200 of the host console 16 is turned on (step S401 in FIG. 11), the priority activator 202 is activated (step S402). When activated, the priority activator 202 turns on the second power supply switch 212 (step S403). At this time, the priority activator 202 forcibly turns on the second power supply switch 212 irrespectively of whether the image capturing instruction information includes an image capturing instruction using the second image capturing apparatus 24 or not. Therefore, the second console 20 and the second image capturing apparatus 24 are supplied with electric power from the second power supply 214 (step S404). Thereafter, the priority activator 202 controls the console selector 42 to forcibly select the second console 20 and the second image capturing apparatus 24 (step S405). The priority activator 202 also activates the menu display controller 204 (step S406). The second image capturing apparatus 24 is now activated (step S407), and the display unit connected to the second console 20 displays a menu screen for the second image capturing apparatus 24 (step S408). The menu display controller 204 controls the display unit 48 of the host console 16 to forcibly display a menu screen for the second image capturing apparatus 24 (step S409). The radiological technician is now able to capture a radiation image while viewing the displayed menu screen.

The second image capturing apparatus 24 becomes operational in about 1 minute after it has started to be supplied with electric power from the second power supply 214, and the radiation source 104 of the second image capturing apparatus 24 becomes stables in about 8 minutes after the second image capturing apparatus 24 has started to be supplied with electric power from the second power supply 214. Then, the second image capturing apparatus 24 is made ready to capture radiation images. Accordingly, the second image capturing apparatus 24 can capture radiation images about 8 minutes after the main power supply switch 200 has been turned on. Therefore, the radiation image capturing system 10 can comply with requests for capturing emergency radiation images of urgent patients, for example.

After the entire radiation image capturing system 10 has been energized, there are situations wherein the supply of electric power to the first image capturing apparatus 22 and the second image capturing apparatus 24 is temporarily stopped for reducing power consumption. In such situations, image capturing instruction information including an image capturing instruction using the first image capturing apparatus 22 may possibly be set or sent to the host console 16.

In such a case, the priority activator 202 also turns on the second power supply switch 212 to activate the second image capturing apparatus 24 in preference to the first image capturing apparatus 22, enabling the second image capturing apparatus 24 to capture radiation images. Inasmuch as the second image capturing apparatus 24 quickly becomes ready to capture radiation images, a patient who is to be imaged does not have to wait for a long period of time until the first image capturing apparatus 22 becomes operational, and prompt action can be performed on the patient.

In the radiation image capturing systems according to the illustrated embodiments, the radiation detector 70 directly converts the applied radiation X into an electric signal with the photoelectric conversion layer 72 (direct conversion type). However, the radiation image capturing systems may employ a radiation detector including a scintillator for converting the applied radiation X into visible light and a solid-state detecting device such as of amorphous silicon (a-Si) or the like for converting the visible light into an electric signal (indirect conversion type: see Japanese patent No. 3494683).

In the illustrated embodiments, the radiation detector 70 employs the photoelectric conversion layer 72 combined with the TFTs 74. However, the TFTs 74 may be combined with other imaging devices such as a CMOS (Complementary Metal-Oxide Semiconductor) image sensor or a CCD (Charge-Coupled Device) image sensor which transfers electric charges while shifting them with shift pulses which correspond to the gate signals for the TFTs.

In the illustrated embodiments, the patient information is acquired through the HIS 12, and the image capturing instruction information is acquired through the RIS 14. However, the patient information and the image capturing instruction information may be directly entered using a keyboard, a coordinate input device, or the like which is connected to the host console or other consoles.

The above and other objects, features, and advantages of the present invention will become more apparent from the following description when taken in conjunction with the accompanying drawings in which a preferred embodiment of the present invention is shown by way of illustrative example.

What is claimed is:

1. A radiation image capturing system comprising:
 a first image capturing apparatus incorporating a radiation detector for detecting a radiation which has passed through a subject and converting the radiation into radiation image information;
 a second image capturing apparatus incorporating a stimulable phosphor panel for detecting a radiation which has passed through a subject, converting the radiation into radiation image information, and holding the radiation image information; and
 a processor for controlling the first image capturing apparatus and the second image capturing apparatus according to image capturing instruction information;
 wherein the processor includes a priority activator for activating the second image capturing apparatus in preference to the first image capturing apparatus when the processor is activated, and
 wherein the priority activator activates the second image capturing apparatus in preference to the first image capturing apparatus irrespectively of whether the image capturing instruction information includes an image capturing instruction using the second image capturing apparatus or not.

2. A radiation image capturing system according to claim 1, wherein the processor includes:
 a display unit; and
 a menu display controller for controlling the display unit to display a menu screen for the second image capturing apparatus when the second image capturing apparatus is activated by the priority activator.

3. A radiation image capturing system according to claim 1, wherein the priority activator activates the second image capturing apparatus and thereafter activates the first image capturing apparatus.

4. A radiation image capturing system comprising:
- a first image capturing apparatus incorporating a radiation detector for detecting a radiation which has passed through a subject and converting the radiation into radiation image information;
- a second image capturing apparatus incorporating a stimulable phosphor panel for detecting a radiation which has passed through a subject, converting the radiation into radiation image information, and holding the radiation image information; and
- a processor for controlling the first image capturing apparatus and the second image capturing apparatus according to image capturing instruction information;
- wherein the processor includes a priority activator for activating the second image capturing apparatus in preference to the first image capturing apparatus when the processor is activated, and
- wherein the priority activator activates the second image capturing apparatus in preference to the first image capturing apparatus in a case where the image capturing instruction information includes an image capturing instruction using the first image capturing apparatus and the first image capturing apparatus is not activated.

5. A radiation image capturing system according to claim 4, wherein the processor includes:
- a display unit; and
- a menu display controller for controlling the display unit to display a menu screen for the second image capturing apparatus when the second image capturing apparatus is activated by the priority activator.

6. A radiation image capturing system according to claim 4, wherein the priority activator activates the second image capturing apparatus and thereafter activates the first image capturing apparatus.

7. A method of capturing radiation image with a radiation image capturing system having a first image capturing apparatus incorporating a radiation detector for detecting a radiation which has passed through a subject and converting the radiation into radiation image information, a second image capturing apparatus incorporating a stimulable phosphor panel for detecting a radiation which has passed through a subject, converting the radiation into radiation image information, and holding the radiation image information, and a processor for controlling the first image capturing apparatus and the second image capturing apparatus according to image capturing instruction information, the method comprising:
- a first step of activating the processor; and
- a second step of activating the second image capturing apparatus in preference to the first image capturing apparatus when the processor is activated,
- wherein the second step activates the second image capturing apparatus in preference to the first image capturing apparatus irrespectively of whether the image capturing instruction information includes an image capturing instruction using the second image capturing apparatus or not.

8. A method of capturing radiation image with a radiation image capturing system having a first image capturing apparatus incorporating a radiation detector for detecting a radiation which has passed through a subject and converting the radiation into radiation image information, a second image capturing apparatus incorporating a stimulable phosphor panel for detecting a radiation which has passed through a subject, converting the radiation into radiation image information, and holding the radiation image information, and a processor for controlling the first image capturing apparatus and the second image capturing apparatus according to image capturing instruction information, the method comprising:
- a first step of activating the processor; and
- a second step of activating the second image capturing apparatus in preference to the first image capturing apparatus when the processor is activated,
- wherein the second step activates the second image capturing apparatus in preference to the first image capturing apparatus in a case where the image capturing instruction information includes an image capturing instruction using the first image capturing apparatus and the first image capturing apparatus is not activated.

* * * * *